(12) United States Patent
Lin

(10) Patent No.: US 7,568,752 B1
(45) Date of Patent: Aug. 4, 2009

(54) SUNSHADE ASSEMBLY

(75) Inventor: Paul Lin, Tainan Hsien (TW)

(73) Assignee: Macauto Industrial Co., Ltd. (TW)

( * ) Notice: Subject to any disclaimer, the term of this patent is extended or adjusted under 35 U.S.C. 154(b) by 0 days.

(21) Appl. No.: 12/041,985

(22) Filed: Mar. 4, 2008

(51) Int. Cl.
*B60J 3/02* (2006.01)

(52) U.S. Cl. .................. 296/97.8; 296/219; 160/370.22

(58) Field of Classification Search ............... 296/97.8, 296/219, 216.01, 141–143; 160/238, 239, 160/265, 271, 273.1, 314, 315, 370.22
See application file for complete search history.

(56) References Cited

U.S. PATENT DOCUMENTS

| | | | | |
|---|---|---|---|---|
| 1,591,104 A * | 7/1926 | Robinson | ..................... | 160/298 |
| 3,075,805 A * | 1/1963 | Golde et al. | .................. | 296/98 |
| 3,092,174 A * | 6/1963 | Winn | ......................... | 160/262 |
| 4,923,244 A * | 5/1990 | Clenet | ........................ | 296/214 |
| 5,201,810 A * | 4/1993 | Ojima et al. | ................ | 160/265 |
| 5,314,053 A * | 5/1994 | Nishimura | ................ | 192/41 S |
| 5,749,621 A * | 5/1998 | Smith | ......................... | 296/219 |
| 6,398,296 B1 * | 6/2002 | Mayer | ........................ | 296/219 |
| 6,546,990 B2 * | 4/2003 | Peeters | .................. | 160/370.22 |
| 6,776,211 B2 * | 8/2004 | Schlecht et al. | ........ | 160/370.22 |
| 6,899,380 B2 * | 5/2005 | Kralik et al. | ................ | 296/214 |
| 7,252,321 B2 * | 8/2007 | Lee | .......................... | 296/97.4 |
| 7,314,079 B2 * | 1/2008 | Yano et al. | ............. | 160/370.22 |
| 2005/0257903 A1 * | 11/2005 | Schimko et al. | ........ | 160/370.22 |
| 2007/0056696 A1 * | 3/2007 | Lin | .......................... | 160/273.1 |
| 2008/0006373 A1 * | 1/2008 | Lin | ............................. | 160/321 |
| 2008/0272612 A1 * | 11/2008 | Harnischfeger et al. | .... | 296/97.9 |

\* cited by examiner

*Primary Examiner*—Jason S Morrow
(74) *Attorney, Agent, or Firm*—Bliss McGlynn, P.C.

(57) ABSTRACT

A sunshade assembly includes a pair of spaced-apart rails, a roller unit, a screen, and a position-retaining unit. Each rail has opposite front and rear ends, and is formed with a track therealong. The roller unit is spaced apart from the front end, and includes an inner tube member and an outer tube member. The screen has a fixed end secured to the outer tube member, a free end, and opposite peripheral edge portions extending into the tracks. The position-retaining unit includes an annular spool, a rope, and a spiral spring. The rope extends along one of the rails, loops around the rear end, and passes through the track in the rail. The spiral spring is disposed in the spool, and has an inner end connected to the outer tube member and an outer end connected to the spool.

6 Claims, 6 Drawing Sheets

SUNSHADE ASSEMBLY

BACKGROUND OF THE INVENTION

1. Field of the Invention

The invention relates to a sunshade assembly, more particularly to a sunshade assembly for a vehicle, in which the sunshade assembly has a screen that may be extended to and maintained at any desired position.

2. Description of the Related Art

To prevent sunlight from entering through a sunroof, car owners and car manufacturers sometimes mount a sunshade assembly on the sunroof. In order to meet the diverse demands of these car owners and car manufacturers, sunshade manufacturers have designed many different types of sunshade assemblies. These sunshade assemblies are different primarily with respect to the design of their retraction mechanism. European Patent EP1598517, entitled "ROLLER BLIND WITH SPRING MOTOR," discloses a retraction mechanism that utilizes a spiral spring to retract a sunshade screen automatically. However, this sunshade assembly requires the installation of a plurality of positioning structural elements on rails for securing the sunshade screen, so that the sunshade screen can be extended to and maintained at an extended position. Hence, a user cannot arbitrarily set the sunshade screen to any desired position. Instead, the positioning of the sunshade screen at an extended position is dictated by locations of the positioning structural elements. Furthermore, an underside roof panel of the vehicle is usually constructed in an arched shape. However, the vast majority of winding rollers for sunshade assemblies is formed as a horizontal straight bar that does not conform to the arched shape of the underside roof panel of the vehicle. As a result, the conventional sunshade assembly occupies a significant amount of interior cabin space.

SUMMARY OF THE INVENTION

It is an object of the present invention to provide a sunshade assembly that can overcome the above drawbacks of the prior art.

According to the present invention, a sunshade assembly that is adapted to be used on a sunroof of a vehicle includes a pair of spaced-apart rails, a roller unit, a screen, and a position-retaining unit. Each of the rails has opposite front and rear ends, and is formed with a track therealong. The roller unit is spaced apart from the front end of each of the rails, and includes an inner tube member, and an outer tube member rotatably sleeved on the inner tube member. The screen has a fixed end secured to the outer tube member, a free end opposite to the fixed end, and opposite peripheral edge portions each extending into the track of a respective one of the rails. The position-retaining unit includes an annular spool defining a center space and disposed on one end of the outer tube member, a rope, and a spiral spring. The rope extends along one of the rails, is looped around the rear end of said one of the rails, and is passed through the track in said one of the rails. The rope has a first end secured to the spool, and a second end secured to the free end of the screen. The spiral spring is disposed in the center space of the spool, and has an inner end connected to the one end of the outer tube member and an outer end connected to the spool.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

The preferred embodiment of a sunshade assembly according to the present invention may be mounted on a vehicle (not shown) so as to cover a sunroof of the vehicle.

Figure 1:
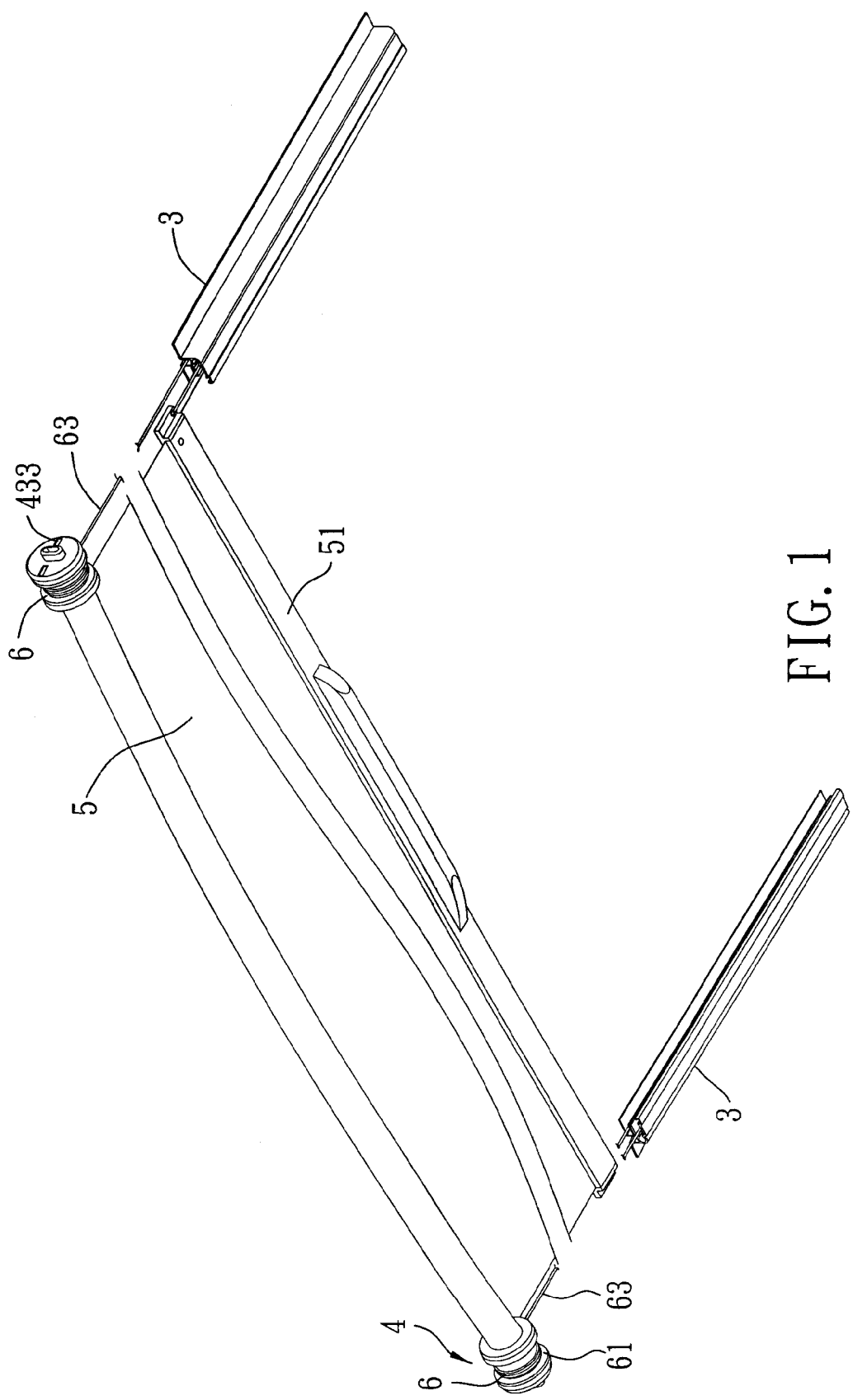
FIG. 1 is a perspective view of the preferred embodiment of a sunshade assembly according to the present invention.
Figure 2:
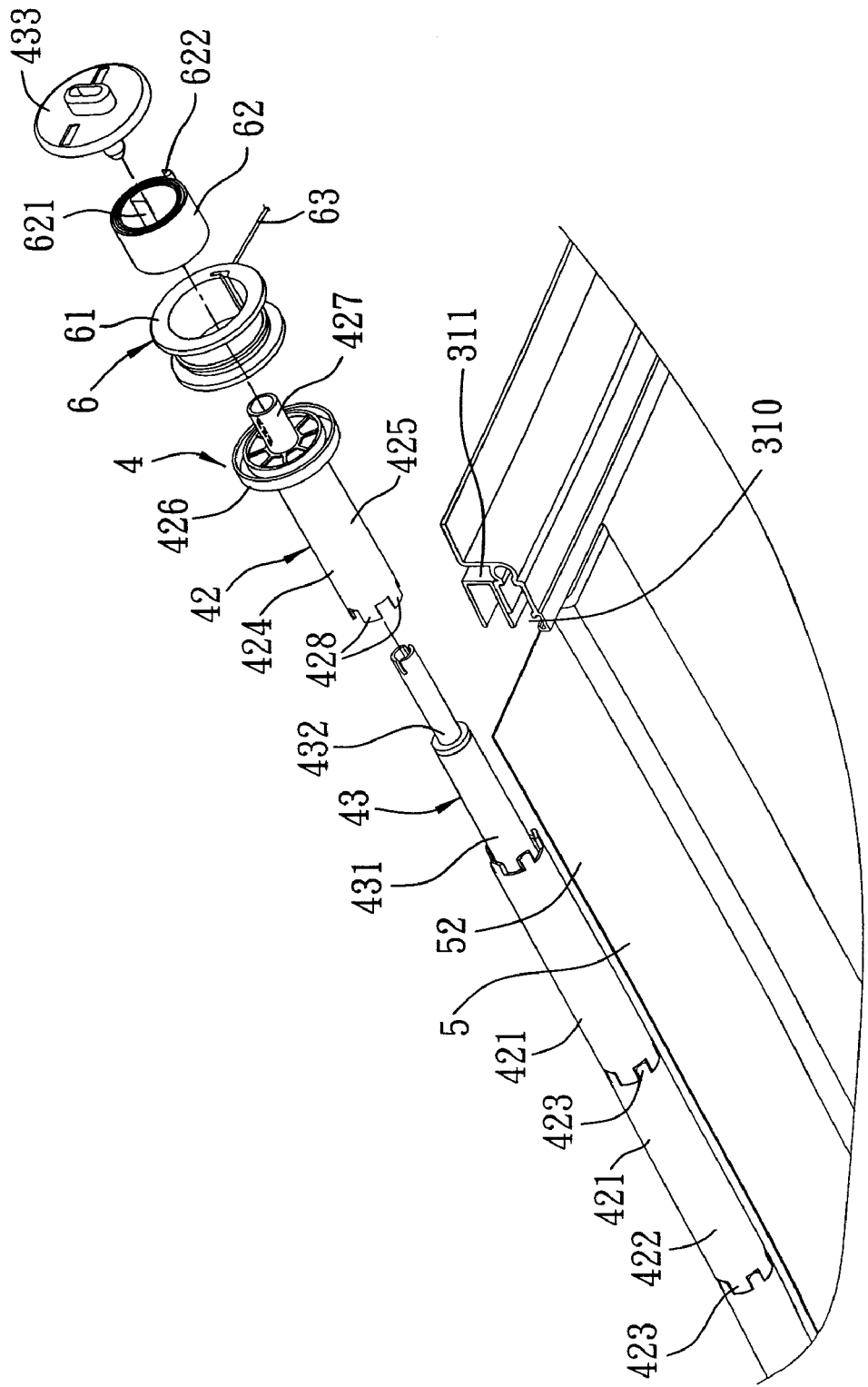
FIG. 2 is an exploded fragmentary perspective view of the preferred embodiment.
Figure 3:
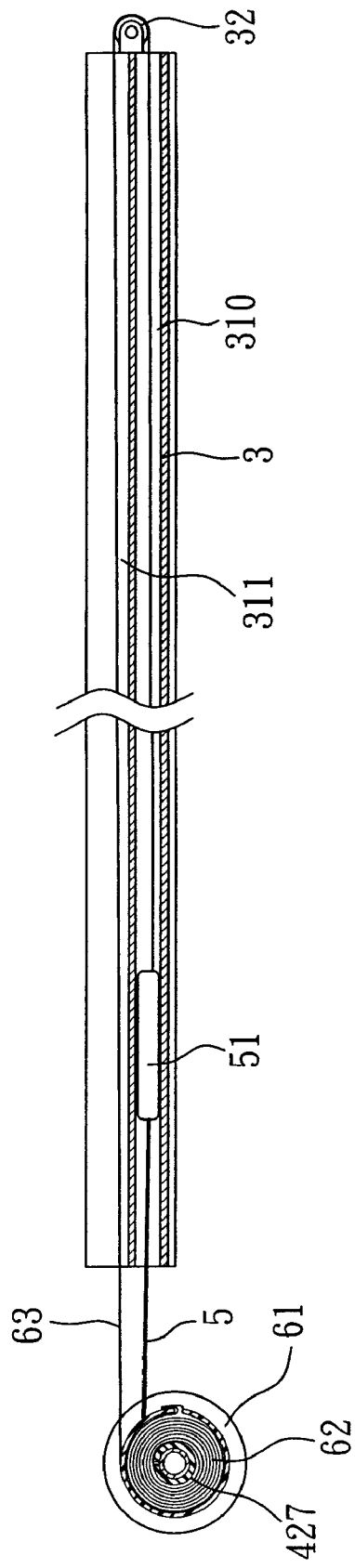
FIG. 3 is a sectional view of the preferred embodiment.
Figure 4:
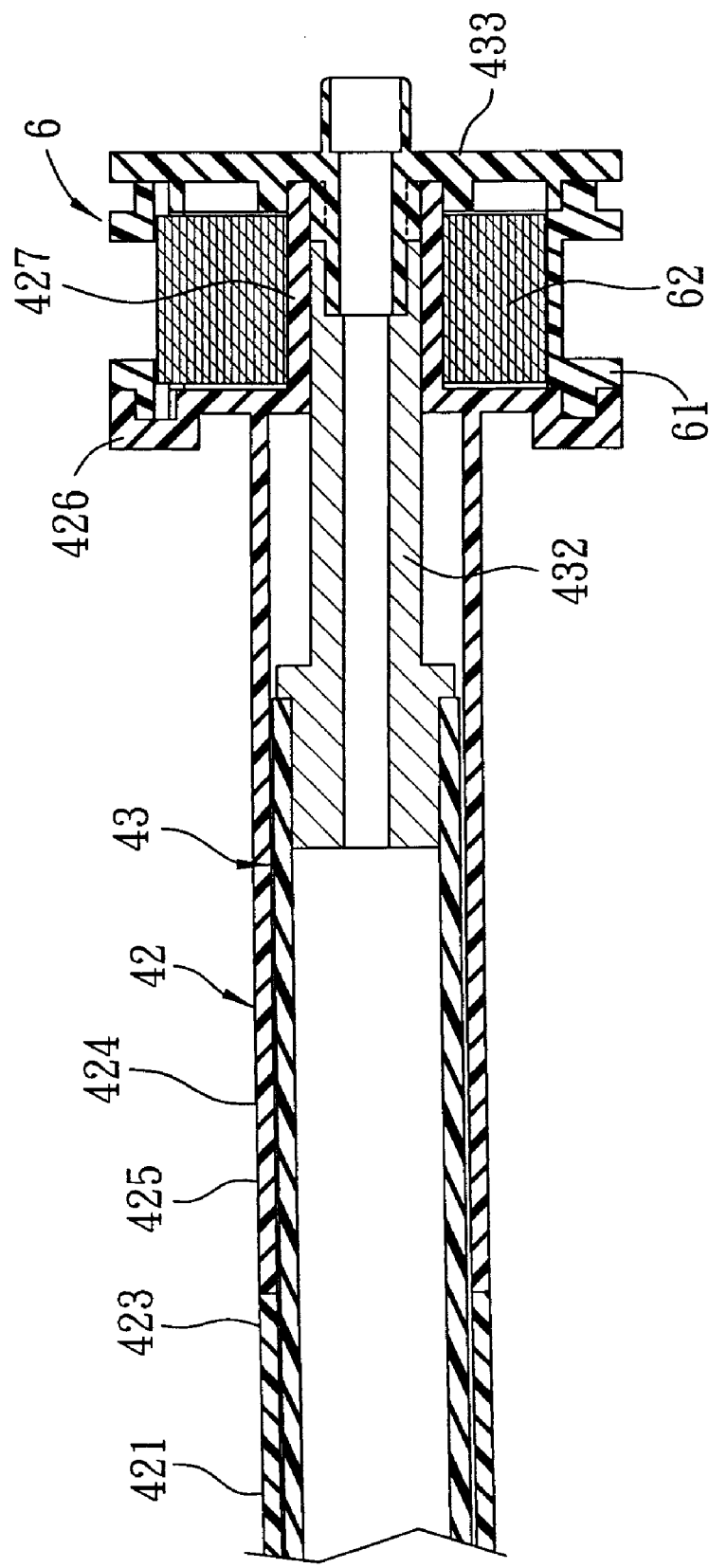
FIG. 4 is a fragmentary sectional view of the preferred embodiment.

Reference is made to FIGS. 1 to 4. The sunshade assembly includes a pair of spaced-apart rails 3, a roller unit 4, a screen 5, and a position-retaining unit 6. Each of the rails 3 has opposite front and rear ends, and is formed with a track 310 and a recess 311 therealong. The track 310 has an opening that faces the track 310 of the other rail 3. The recess 311 is parallel to and above the track 310. Each rail 3 includes a pulley 32 rotatably disposed at the rear end thereof.

The roller unit 4 is spaced apart from the front end of the rails 3, and includes an inner tube member 43 that is fixedly assembled onto the vehicle, and an outer tube member 42 sleeved on the inner tube member 43 and rotatably driven relative to the inner tube member 43.

The screen 5 has a fixed end 52 secured to the outer tube member 42, a free end 51 opposite to the fixed end 52, and opposite peripheral edge portions each extending into the track 310 of a respective one of the rails 3.

The position-retaining unit 6 includes an annular spool 61 defining a center space and that is disposed on one end of the outer tube member 42, a rope 63, and a spiral spring 62. The rope 63 has a first end secured to the spool 61, and a second end that extends along the recess 311 to loop around the pulley 32 of the corresponding rail 3, and that is secured to the free end 51 of the screen 5 after being passed through the track 310 in the corresponding rail 3. The spiral spring 62 is disposed in the center space of the spool 61, and has an inner end 621 connected to the one end of the outer tube member 42, and an outer end 622 connected to the spool 61.

In some embodiments, the sunshade assembly may include a pair of the position-retaining units 6, in which case the positioning-retaining units 6 are disposed respectively on opposite ends of the outer tube member 42. The inner tube member 43 has a curved shape. The outer tube member 42 of the roller unit 4 includes a plurality of first sections 421 sequentially linked to one another to rotate in unison, and a pair of second sections 424 linked respectively to outermost ones of the first sections 421 to rotate together therewith. The first and second sections 421, 424 are pivotable relative to each other in a vertical direction so as to conform to the curved shape of the inner tube member 43.

Each of the first sections 421 of the outer tube member 42 includes a first tube portion 422 sleeved on the inner tube member 43, and a plurality of first teeth 423 projected axially from and circumferentially spaced apart on opposite ends of the first tube portion 422. Each of the second sections 424 of the outer tube member 42 includes a second tube portion 425 sleeved on the inner tube member 43 and that has inner and outer ends, and a plurality of second teeth 428 projected axially from and circumferentially spaced apart on the inner end of the second tube portion 425. The first teeth 423 of each of the first sections 421 meshes with the first teeth 423 of an adjacent pair of the first sections 421, or with the first and second teeth 423, 428 of an adjacent one of the first sections 421 and an adjacent one of the second sections 424 so as to enable rotational transmission.

Each of the second sections 424 of the outer tube member 42 further includes an extension arm 427 protruding outwardly from the outer end thereof, and a flange 426 protruding radially therefrom between the extension arm 427 and the second tube portion 425. The inner end 621 of the spiral spring 62 is connected to the extension arm 427 of one of the second sections 424 of the outer tube member 42. As such, the spiral spring 62 is sandwiched respectively between the spool 61 and the extension arm 427.

The inner tube member 43 includes an inner tube body 431 extending through the first and second sections 421, 424, a pair of connecting rods 432 respectively and axially coupled to opposite ends of the inner tube body 431, and a pair of fixtures 433 fixed respectively to opposite ends of the inner tube body 431 and each spaced apart from the flange 426 of a respective one of the second sections 424. The inner tube body 431 has the curved shape of the inner tube member 43 so as to conform to the contour curved shape of an underside roof panel of the vehicle.

Figure 5:
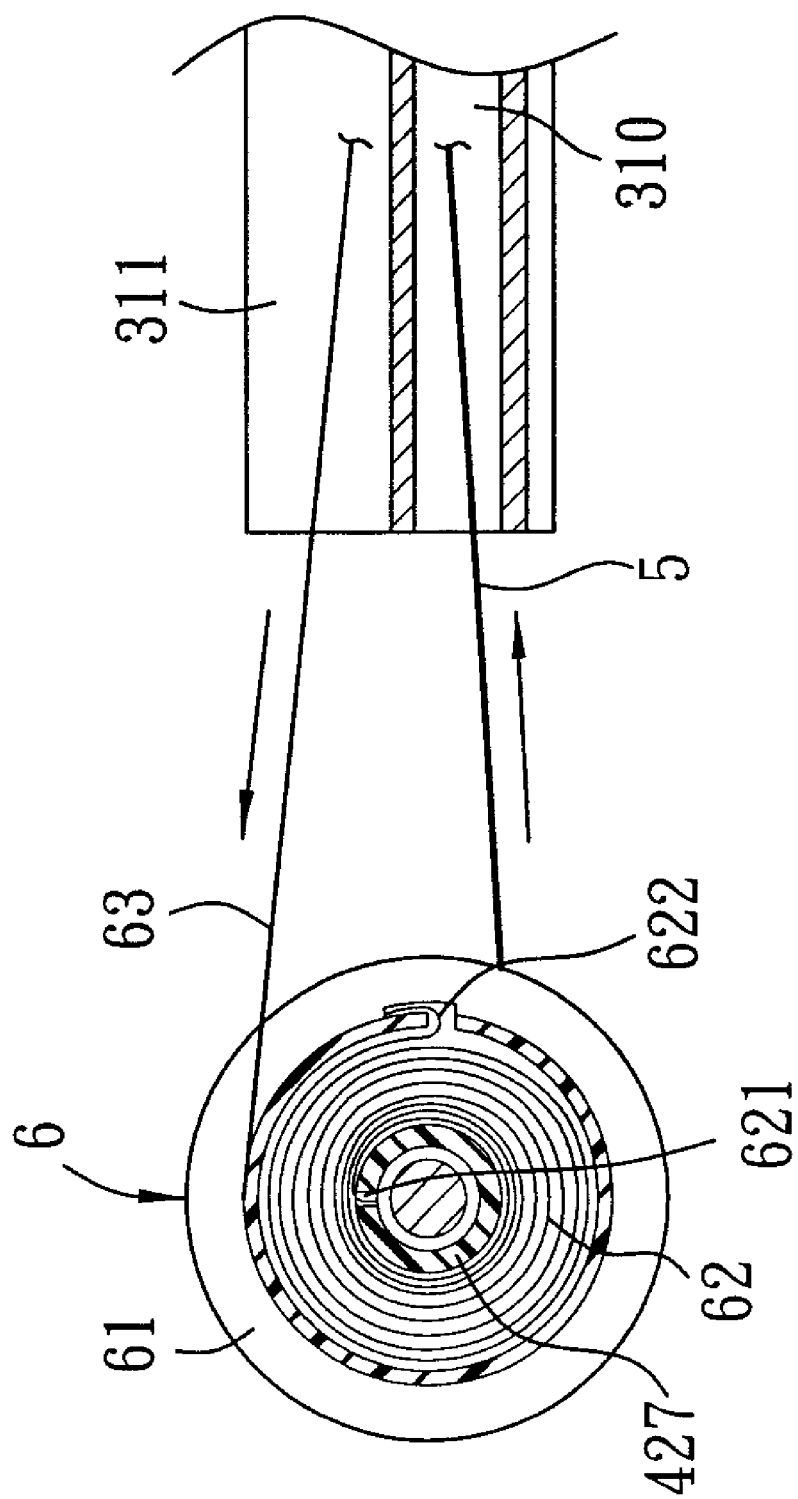
FIG. 5 is a fragmentary view of FIG. 3, illustrating how a position-retaining unit operates during extension of a screen.

The spool 61 is disposed and freely rotatable between the flange 426 of said one of the second sections 424 and a respective one of the fixtures 433. Reference is now made to FIGS. 1, 2, 3, and 5. The handle 51 is pulled along the pair of tracks 310 in the rails 3 to begin covering the sunroof. By extending the screen 5, the first and second sections 421, 424 move together with the screen 5 to thereby rotate in the counterclockwise direction, such that the corresponding extension arm 427 is also driven to rotate the inner end 621 of the spiral spring 62 in the counterclockwise direction. Accordingly, the inner end 621 of the spiral spring 62 is suddenly compressed in a resilient manner, such that resilient energy accumulated by the compression of the spiral spring 62 forces the outer end 622 of the spiral spring 62 to propel the spool 61 to rotate also in the counterclockwise direction. Hence, the spool 61 winds the rope 63 to take up the slack therein caused by the extension of the screen 5. Consequently, the rope 63 holds the screen 5 in place. As soon as the pulling force on the screen 5 is released, the resilient energy is exhausted. Therefore, any energy that might be remaining in the spiral spring 62 is not sufficient to drive the outer tube member 42 in retracting the screen 5, and the screen 5 is maintained at its present extended position.

Figure 6:
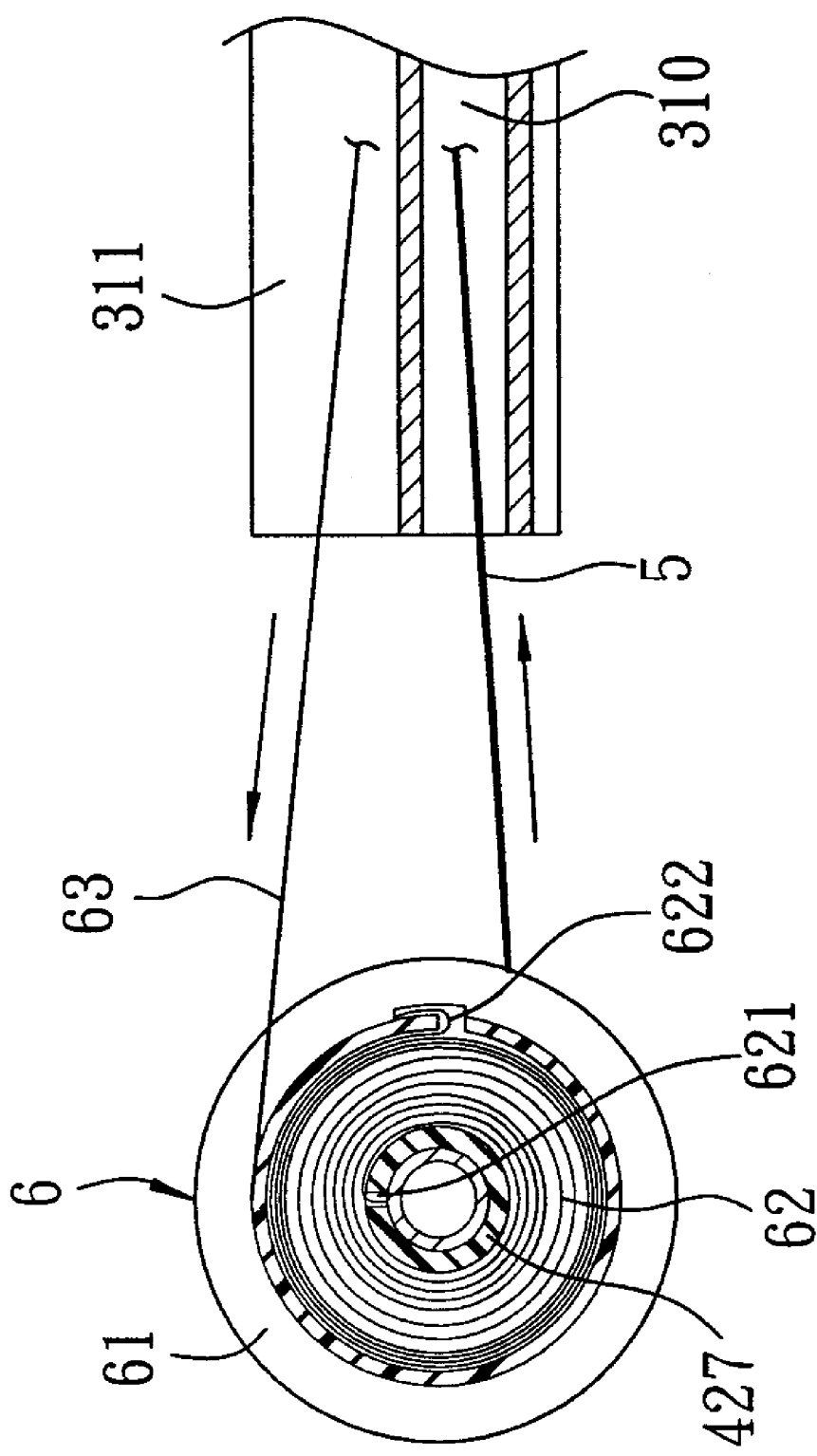
FIG. 6 is a view similar to FIG. 5 to illustrate how the position-retaining unit operates during retraction of the screen.

Reference is now made to FIGS. 1, 2, 3, and 6. To begin retracting the screen 5, the user simply pushes the handle 51 of the screen 5 toward the roller unit 4. The forward displacement of the handle 51 pulls the rope 63 so that the rope 63 drives the spool 61 and, simultaneously, the outer end 622 of the spiral spring 62 to rotate in a clockwise direction. As a result, the outer end 622 of the spiral spring 62 is suddenly compressed in a resilient manner. In this state, resilient energy accumulated by the compression of the spiral spring 62 subsequently forces the inner end 621 of the spiral spring 62 to propel the extension arm 427 of the corresponding second section 424 and the first sections 421 to rotate in the clockwise direction. This results in winding of the screen 5 on the outer tube member 42. As soon as the pushing force on the screen 5 is released, the resilient energy is exhausted, which in turn, enables the screen 5 to be maintained at its present, desired retracted position.

In some embodiments, the sunshade assembly may further include a motor (not shown) connected to one of the second sections 424 of the outer tube member 42 for rotating the outer tube member 42 (through said one of the second sections 424) and/or the position-retaining unit 6. As such, the extension and retraction of the screen 5 can be automatically performed.

The sunshade assembly of the preferred embodiment of the present invention has the following advantages:

1. The screen 5 can be extended to and maintained at any desired position.

2. Unlike in the conventional sunshade assembly where the winding roller of the sunshade assembly is formed as a straight bar, in the present invention, the inner tube member 43 is curved, and the first and second sections 421, 424 are pivotable relative to each other in a vertical direction so as to conform to the curved shape of the inner tube member 43. This permits the sunshade assembly to be fittingly mounted on the underside roof panel of the vehicle that has a curved contour, thereby effectively utilizing the interior space of the vehicle.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A sunshade assembly adapted to be used on a sunroof of a vehicle, comprising:

a pair of spaced-apart rails each having opposite front and rear ends, and each formed with a track therealong;

a roller unit spaced apart from said front end of each of said rails, and including an inner tube member and an outer tube member rotatably sleeved on said inner tube member;

a screen having a fixed end secured to said outer tube member, a free end opposite to said fixed end, and opposite peripheral edge portions each extending into said track of a respective one of said rails;

a position-retaining unit including an annular spool defining a center space and disposed on one end of said outer tube member, a rope extending along one of said rails, looped around said rear end of one of said rails, and passed through said track in one of said rails, said rope having a first end secured to said spool and a second end secured to said free end of said screen, and a spiral spring disposed in said center space of said spool, and having an inner end connected to said one end of said outer tube member and an outer end connected to said spool; and wherein said inner tube member has a curved shape, and said outer tube member of said roller unit includes a plurality of first sections sequentially linked to one another to rotate in unison, and a pair of second sections linked respectively to outermost ones of said first sections to rotate together therewith, said first and second sections being pivotable relative to each other in a vertical direction, said annular spool being disposed on one of said second sections of said outer tube member, said inner end of said spiral spring being connected to said one of said second sections of said outer tube member.

2. The sunshade assembly as claimed in claim 1, wherein each of said first sections of said outer tube member includes a first tube portion sleeved on said inner tube member, and a plurality of first teeth projected axially from and circumferentially spaced apart on opposite ends of said first tube portion, and each of said second sections of said outer tube member includes a second tube portion sleeved on said inner tube member and having inner and outer ends, and a plurality of second teeth projected axially from and circumferentially spaced apart on said inner end of said second tube portion, said first teeth of each of said first sections meshing with said first teeth of an adjacent pair of said first sections, or with said first and second teeth of an adjacent one of said first sections and an adjacent one of said second sections.

3. The sunshade assembly as claimed in claim 2, wherein each of said second sections of said outer tube member further includes an extension arm protruding outwardly from said outer end thereof, said inner end of said spiral spring being connected to said extension arm of said one of said second sections of said outer tube member.

4. The sunshade assembly as claimed in claim 3, wherein each of said second sections of said outer tube member further includes a flange protruding radially therefrom between said extension arm and said second tube portion, said inner tube member including an inner tube body having the curved shape and extending through said first and second sections, and a pair of fixtures fixed respectively to opposite ends of said inner tube body and each spaced apart from said flange of a respective one of said second sections, said spool being disposed and freely rotatable between said flange of said one of said second sections and a respective one of said fixtures.

5. The sunshade assembly as claimed in claim 1, wherein said one of said rails includes a pulley rotatably disposed at said rear end thereof, said rope being looped around said pulley.

6. The sunshade assembly as claimed in claim 5, wherein each of said rails is further formed with a recess therealong and spaced apart from said track, said rope extending along said recess, looping around said pulley, and passing through said track of said one of said rails.

* * * * *